United States Patent
Leu

(10) Patent No.: US 9,936,126 B2
(45) Date of Patent: Apr. 3, 2018

(54) AUTOFOCUS METHOD OF CAMERA USING FACE DETECTION AND APPARATUS FOR CONTROLLING THE CAMERA

(71) Applicant: SAMSUNG ELECTRONICS CO., LTD., Suwon-si, Gyeonggi-do (KR)

(72) Inventor: Ho June Leu, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/212,338

(22) Filed: Jul. 18, 2016

(65) Prior Publication Data

US 2017/0064197 A1 Mar. 2, 2017

(30) Foreign Application Priority Data

Aug. 28, 2015 (KR) .......................... 10-2015-0121411

(51) Int. Cl.
G02B 13/16 (2006.01)
H04N 5/225 (2006.01)
H04N 5/232 (2006.01)

(52) U.S. Cl.
CPC ..... *H04N 5/23219* (2013.01); *H04N 5/23212* (2013.01)

(58) Field of Classification Search
CPC .................. H04N 5/23219; H04N 5/23212
USPC ................ 348/335, 340, 345, 348, 350, 352
See application file for complete search history.

(56) References Cited

U.S. PATENT DOCUMENTS

| | | | |
|---|---|---|---|
| 6,906,748 B1* | 6/2005 | Kawase | H04N 1/40068 348/246 |
| 7,733,412 B2 | 6/2010 | Takayama | |
| 7,860,386 B2 | 12/2010 | Terashima | |
| 8,233,078 B2* | 7/2012 | Chang | H04N 5/23212 250/201.4 |
| 8,300,139 B2 | 10/2012 | Takayama | |
| 8,570,429 B2 | 10/2013 | Park et al. | |
| 8,730,375 B2 | 5/2014 | Onozawa | |
| 2009/0009651 A1 | 1/2009 | Takayanagi | |
| 2009/0095880 A1 | 4/2009 | Otsuki | |
| 2009/0161232 A1* | 6/2009 | Iwasaki | G02B 7/102 359/697 |
| 2010/0060780 A1* | 3/2010 | Shibagami | G02B 7/08 348/345 |

FOREIGN PATENT DOCUMENTS

| | | |
|---|---|---|
| JP | 2008191683 | 8/2008 |
| JP | 2009134569 | 6/2009 |
| JP | 2010243731 | 10/2010 |
| JP | 4824586 | 9/2011 |
| JP | 2013167891 | 8/2013 |
| KR | 0710378 | 4/2007 |
| KR | 0850466 | 7/2008 |
| KR | 20110103795 | 9/2011 |

* cited by examiner

*Primary Examiner* — Yogesh Aggarwal
(74) *Attorney, Agent, or Firm* — Volentine & Whitt, PLLC

(57) ABSTRACT

An autofocus method of a camera, having an actuator controlling the position of a lens in an open-loop mode, includes receiving and analyzing an image captured using the lens and generating a face detection signal indicating whether a face is detected based on the analysis result. The size of the face is calculated when the face is detected, and a start position of the lens is determined based on the size of the face. A focus position of the lens is sought based on the start position of the lens.

17 Claims, 8 Drawing Sheets

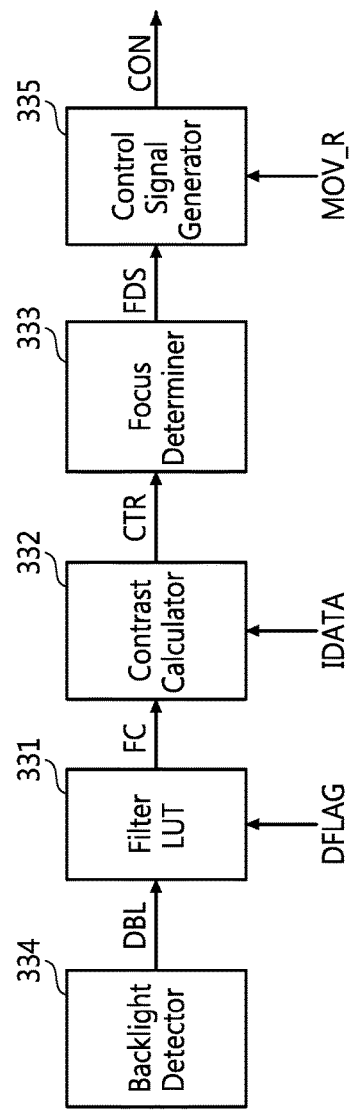

AUTOFOCUS METHOD OF CAMERA USING FACE DETECTION AND APPARATUS FOR CONTROLLING THE CAMERA

CROSS-REFERENCE TO RELATED APPLICATIONS

This application claims priority under 35 U.S.C. § 119(a) from Korean Patent Application No. 10-2015-0121411 filed on Aug. 28, 2015, the disclosure of which is hereby incorporated by reference in its entirety.

BACKGROUND

Embodiments of the disclosure relate to an autofocus apparatus and method for a camera, and more particularly, to a camera controller using face detection, an autofocus method of a camera, and a system including the camera controller.

Autofocus is a function of automatically focusing on an object and provides faster and more accurate focusing than manual focus. Autofocus mode may be largely divided into active mode and passive mode according to whether a range sensor is used or not. The active mode uses a range sensor including an ultrasound or infrared transceiver, which is specially provided apart from an image sensor, to calculate a distance of an object from a camera and calculate a lens position for correct focus based on the distance. Autofocus performance varies with the accuracy of the range sensor. When a high-priced range sensor is used to achieve high autofocus performance, manufacturing cost increases. The passive mode analyzes an input image to calculate a lens position for correct focus. The passive mode is divided into phase detection mode which uses a phase difference sensor to calculate a phase difference of an image and calculate a lens position from the phase difference and contrast detection mode which measures a contrast of an image while moving a lens within a predetermined range and seeks a lens position giving the highest contrast. The contrast detection mode which does not use a phase difference sensor needs to move a lens until a maximum contrast is detected, thus requiring a relatively long time to achieve correct focus. In addition, accuracy greatly varies with the design of a contrast filter.

SUMMARY

According to some embodiments of the disclosure, there is provided an autofocus method of a camera which includes an actuator controlling a position of a lens in an open-loop mode. The autofocus method includes receiving and analyzing an image captured using the lens and generating a face detection signal indicating whether a face is detected based on the analysis result, calculating a size of the face when the face is detected, determining a start position of the lens based on the size of the face, and seeking a focus position of the lens based on the start position of the lens.

The seeking the focus position of the lens may include outputting a position control signal based on the start position, receiving a next image which has been captured using the lens driven to the start position, calculating a contrast value of the next image using a contrast filter, and determining whether the lens is in focus based on the contrast value.

A coefficient of the contrast filter may change according to the face detection signal.

The autofocus method may further include generating a backlight detection signal indicating existence or non-existence of backlight based on the analysis result. The coefficient of the contrast filter may change according to the backlight detection signal.

The calculating the contrast value may include selecting a contrast filter coefficient corresponding to the face detection signal and the backlight detection signal from a filter lookup table which stores a plurality of different contrast filter coefficients; and applying the selected contrast filter coefficient to the contrast filter.

The seeking the focus position of the lens may further include outputting a position change signal when it is determined that the lens is not in focus and receiving another image which has been captured using the lens driven to a position changed according to the position change signal and calculating the contrast value of the another image.

The determining the start position of the lens based on the size of the face may include selecting at least two start position information items approximating to the size of the face from a lookup table which stores start position information corresponding to each of a plurality of face sizes; and performing interpolation on the at least two start position information items and outputting an interpolation result as the start position.

The autofocus method may further include setting initial position information in a register and seeking the focus position based on the initial position information when the face is not detected in the image.

According to other embodiments of the disclosure, there is provided a camera controller for controlling a camera module, which includes an actuator controlling a position of a lens in an open-loop mode. The camera controller includes a face detector configured to receive and analyze an image captured using the lens, to generate a face detection signal indicating whether a face is detected based on the analysis result, and to calculate a size of the face when the face is detected; a lens moving range determiner configured to determine a start position of the lens based on the size of the face; and an autofocus calculator configured to output a position control signal for controlling the position of the lens according to the start position to the camera module and to seek a focus position of the lens.

The lens moving range determiner may include a lookup table configured to store multiple items of start position information corresponding to each of a plurality of face sizes and to output at least one start position information item approximating to the calculated size of the face, a register configured to store multiple items of initial position information, and a selector configured to select and output one of the items of initial position information and the start position information item from the lookup table in response to the face detection signal.

The autofocus calculator may output the position control signal to the camera module based on the start position, may receive a next image which has been captured using the lens driven to the start position, may calculate a contrast value of the next image using a contrast filter, and may determine whether the lens is in focus based on the contrast value.

The autofocus calculator may include a filter lookup table configured to store a plurality of different filter coefficients and to select and output one of the filter coefficients which corresponds to the face detection signal; and a contrast calculator configured to calculate the contrast value using the contrast filter to which the selected filter coefficient has been applied.

The autofocus calculator may further include a backlight detector configured to analyze the captured image and generate a backlight detection signal indicating existence or non-existence of backlight. A coefficient of the contrast filter may change according to the backlight detection signal.

According to other embodiments of the disclosure, there is provided a camera having a lens and an electronic controller. The electronic controller determines whether imagery of a face exists in a first image created by light received through the lens, selects a contrast filter among a plurality of contrast filters based upon the imagery determination, and applies the selected contrast filter to the first image or a second image, created by light received through the lens, to determine whether the first or second image is focused.

BRIEF DESCRIPTION OF THE DRAWINGS

The above and other features and advantages of the disclosure will become more apparent by describing in detail exemplary embodiments thereof with reference to the attached drawings in which:

FIG. 5 is a diagram of a lookup table (LUT) illustrated in FIG. 4 according to some embodiments of the disclosure;

FIG. 6 is a block diagram of an autofocus calculator illustrated in FIG. 3 according to some embodiments of the disclosure;

DETAILED DESCRIPTION OF THE EMBODIMENTS

Figure 1:
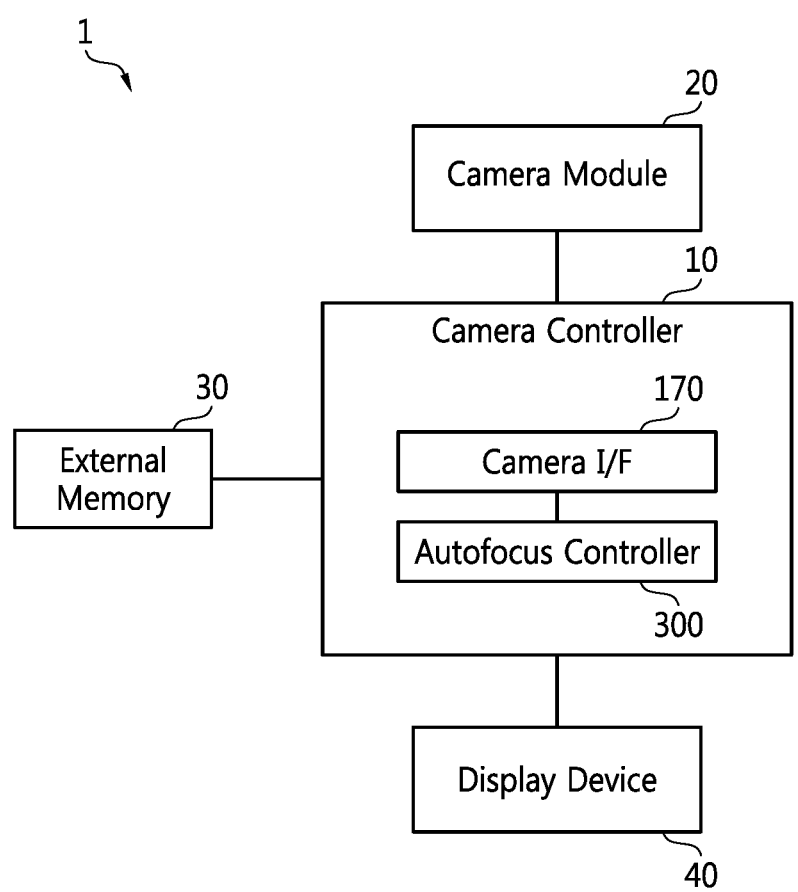
FIG. 1 is a block diagram of a camera system according to some embodiments of the disclosure.

The disclosure now will be described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
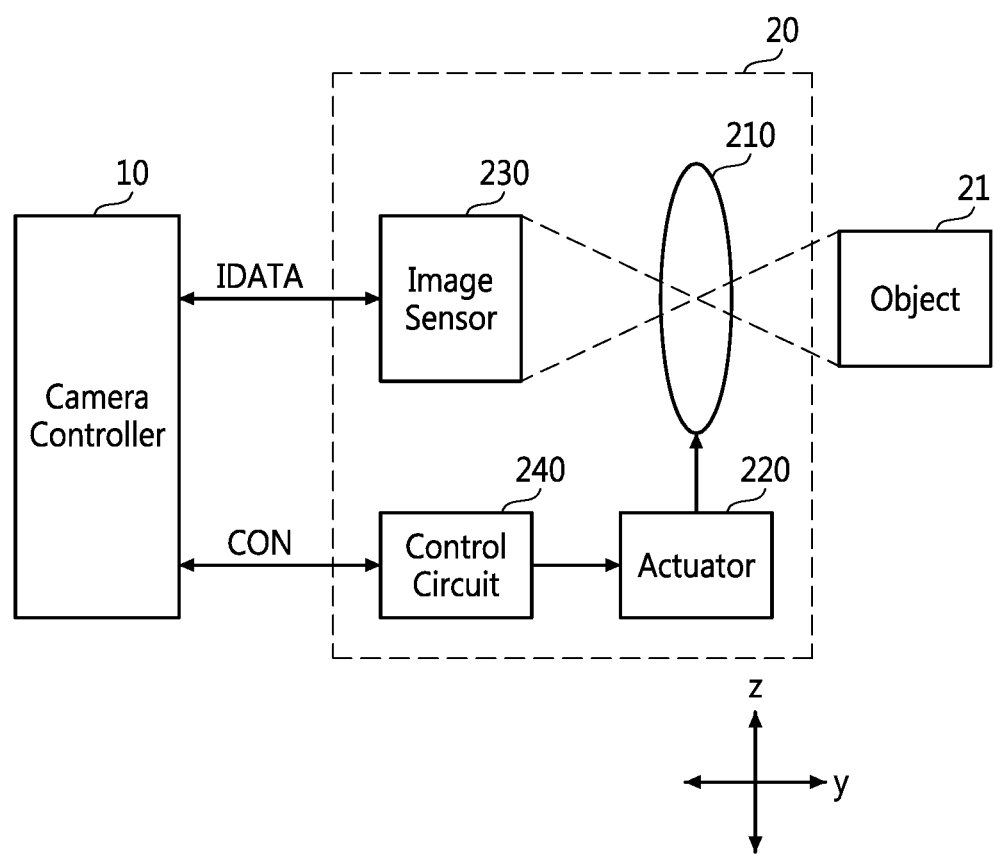
FIG. 2 is a block diagram of a camera module illustrated in FIG. 1 according to some embodiments of the disclosure.
Figure 3:
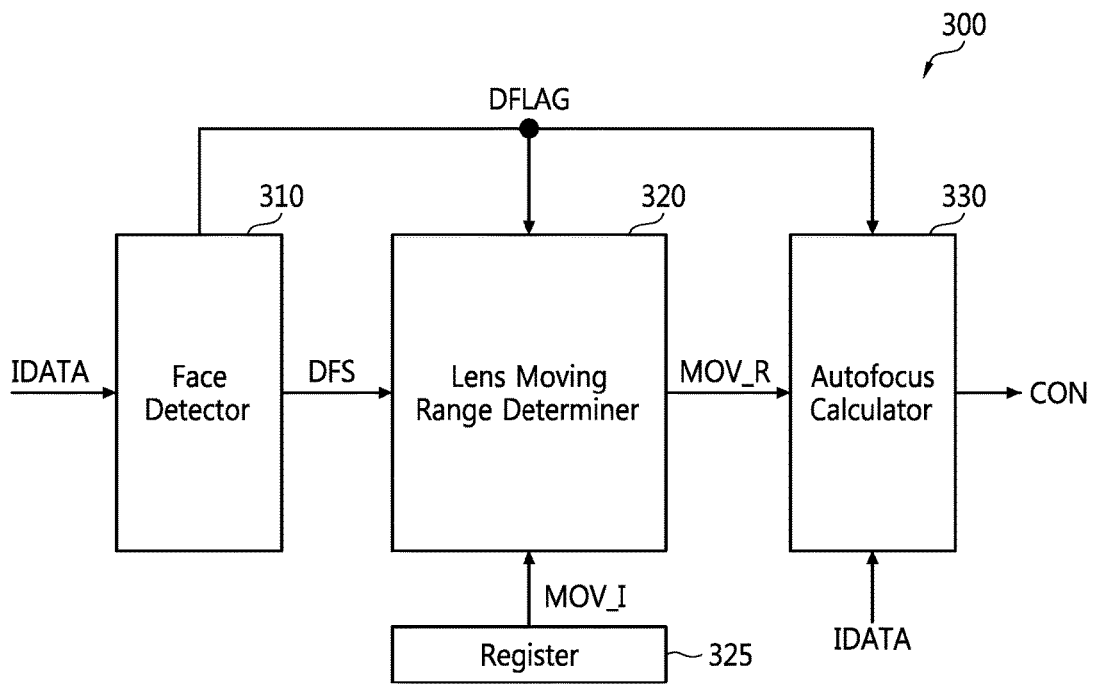
FIG. 3 is a block diagram of an autofocus controller illustrated in FIG. 1 according to some embodiments of the disclosure.
Figure 4:
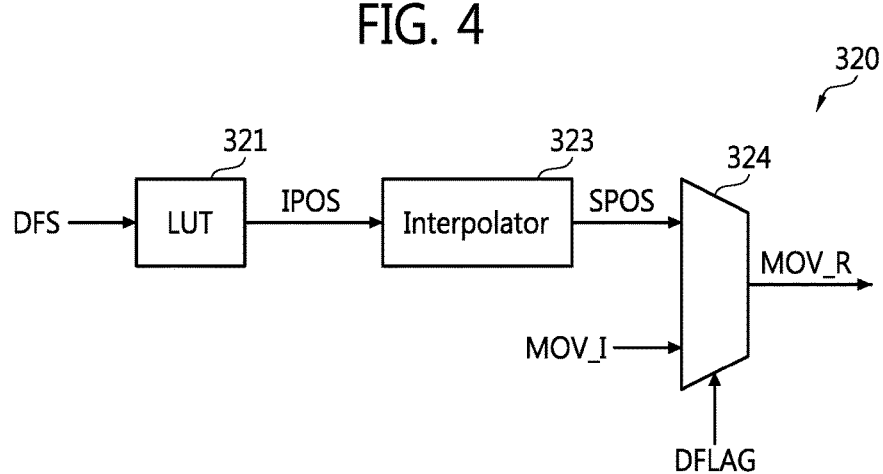
FIG. 4 is a block diagram of a lens moving range determiner illustrated in FIG. 3 according to some embodiments of the disclosure.

FIG. 1 is a block diagram of a camera system 1 according to some embodiments of the disclosure. FIG. 2 is a block diagram of a camera module 20 illustrated in FIG. 1 according to some embodiments of the disclosure. FIG. 3 is a block diagram of an autofocus controller 300 illustrated in FIG. 1 according to some embodiments of the disclosure. FIG. 4 is a block diagram of a lens moving range determiner 320 illustrated in FIG. 3 according to some embodiments of the disclosure. FIG. 5 is a diagram of a lookup table (LUT) 321 illustrated in FIG. 4 according to some embodiments of the disclosure. FIG. 6 is a block diagram of an autofocus calculator 330 illustrated in FIG. 3 according to some embodiments of the disclosure.

Referring to FIGS. 1 through 6, the camera system 1 may include a camera controller 10, the camera module 20, an external memory 30, and a display device 40. The camera system 1 may not include some elements (e.g., the external memory 30) or may further include other elements (e.g., a temperature sensor and a gravity sensor) in other embodiments. The camera module 20 may include a lens 210, an actuator 220, an image sensor 230, and a control circuit 240.

The lens 210 may be a lens (hereinafter, referred to as a "focusing lens") for taking the focus. The camera module 20 may also include a lens (not shown) for gathering light and a lens (not show) for scattering light. In other words, the camera module 20 may include at least two lenses which perform different functions from each other. The focusing lens 210 may be implemented as a glass lens, a plastic lens, or a liquid lens, but the disclosure is not restricted to these examples. When the focusing lens 210 is implemented as a plastic lens, the camera system 1 may be marketed at low-middle prices.

The actuator 220 adjusts the position of the focusing lens 210 to perform autofocus. The actuator 220 may be a voice coil motor (VCM) actuator which controls the position of the focusing lens 210 in an open-loop mode. The open-loop mode is different from a closed-loop mode, controlling the position of the lens 210 using feedback information about the position of the lens 210, in that the position of the lens 210 is adjusted without using the feedback. Accordingly, for the open-loop mode, the camera module 20 does not include a sensor for measuring or sensing the position of the lens 210.

The VCM actuator 220 levitates the lens 210 using an electromagnetic field induced in a coil when current is supplied to a VCM. Therefore, the VCM actuator 220 adjusts the position of the lens 210 by adjusting the amount of current supplied to the VCM.

The actuator 220 may move the focusing lens 210 back and forth (e.g., along the y-axis), up and down (e.g., along the z-axis), and from side to side (e.g., along the x-axis) to allow the lens 210 to be in focus. In FIG. 2, the x-axis may be perpendicular to the y-z plane. For clarity of the description, it is assumed that the z-axis is perpendicular to the surface of the earth and the x-axis and the z-axis are perpendicular to the y-axis.

The control circuit 240 controls the actuator 220 according to a position control signal CON issued from the camera controller 10. The control circuit 240 may supply a current corresponding to the position control signal CON of the camera controller 10 to the actuator 220.

The image sensor 230 may operate according to the control of the camera controller 10 to generate image information. The image sensor 230 senses an object 21 picked up through the lens 210 and transmits an image to the camera controller 10 according to the control of the camera controller 10.

The camera controller 10 may process the image sensed by the image sensor 230 and may store the processed image in the external memory 30 or output the processed image to the display device 40. At this time, the display device 40 may be any device that can output an image. The display device 40 may be implemented as a liquid crystal display (LCD) device, a light emitting diode (LED) display device, an organic LED (OLED) display device, or an active matrix OLED (AMOLED) display device. The display device 40 may receive an image (e.g., a still image or a moving image) from the camera controller 10 or the external memory 30 and display the image through a display (e.g., LCD or AMOLED display).

The camera controller 10 may control the operations of the camera module 20, the external memory 30, and the display device 40; may communicate control signals and data with these elements 20, 30, and 40; and may process the data. The camera controller 10 may be implemented as a processor or a system-on-chip (SoC) including at least one processor, but the disclosure is not restricted to these examples.

The camera controller 10 may include a camera interface (I/F) 170 and the autofocus controller 300. The camera controller 10 may also include additional elements such as at least one processing unit or core and interface circuits. The autofocus controller 300 may be implemented by at least one processing unit.

The camera I/F 170 interfaces with the camera module 20. The camera I/F 170 may output the control signal CON for controlling the camera module 20 and may receive image data IDATA from the camera module 20 according to a predetermined interface standard or protocol. The camera I/F 170 may store the image data IDATA received from the camera module 20 in the external memory 30 or may transmit the image data IDATA to the autofocus controller 300.

The autofocus controller 300 determines a moving range of the lens 210, in which the focus position of the lens 210 is sought, and seeks the focus position of the lens 210 in the moving range in an autofocus mode in which autofocus is performed. Referring to FIG. 3, the autofocus controller 300 may include a face detector 310, the lens moving range determiner 320, a register 325, and the autofocus calculator 330.

The face detector 310 analyzes the image data IDATA received from the camera module 20 to detect a face. In detail, the face detector 310 may analyze the image data IDATA to detect whether a human face is included in the image data IDATA and may output a face detection signal DFLAG indicating whether or not the face is detected. For instance, the face detector 310 may output the face detection signal DFLAG at a first logic level (e.g., "1") when a face is detected in the image data IDATA and may output the face detection signal DFLAG at a second logic level (e.g., "0") when a face is not detected in the image data IDATA.

When a face is detected in the image data IDATA, the face detector 310 calculates a face size DFS and sends it to the lens moving range determiner 320. The face size DFS may be expressed as a proportion of a face in the image data IDATA. For instance, when it is assumed that the size of a frame of the image data IDATA is 100, the face size DFS may have a value of at least 0 and at most 100.

The face size DFS changes according to the distance between the lens 210 and a human. The closer the distance between the lens 210 and the human, the larger the face size DFS.

The lens moving range determiner 320 determines a lens moving range MOV_R based on the face size DFS. The lens moving range determiner 320 may include the LUT 321, an interpolator 323, and a selector 324.

The LUT 321 stores start position information IPOS corresponding to each of a plurality of face sizes DFS. For instance, the LUT 321 stores a plurality of face size-to-start position entries. Each of the entries may include a predetermined face size DFS and corresponding start position information IPOS.

The start position information IPOS corresponding to each face size DFS may be calculated by testing or simulating the camera module 20 or a representative of the camera module 20. For instance, as shown in FIG. 5, the LUT 321 may store the start position information IPOS set to "400" for a face size DFS of "10" and the start position information IPOS set to "450" for a face size DFS of "20". The LUT 321 may select and output the start position information IPOS corresponding to the face size DFS which has been calculated or at least one entry of the start position information IPOS most approximating to the calculated face size DFS among the entries that have been stored in advance. For instance, the LUT 321 may select and output two entries of the start position information IPOS approximating to the calculated face size DFS among a plurality of entries that have been stored in advance. At this time, the interpolator 323 may perform interpolation on the two entries of the start position information IPOS to calculate start position information SPOS corresponding to the face size DFS.

The interpolator 323 may be omitted in other embodiments. In addition, instead of the LUT 321, a start position information calculator (not shown), which calculates and outputs the start position information IPOS corresponding to the face size DFS according to a predetermined algorithm, may be used.

The selector 324 may select and output, as the lens moving range MOV_R, either the start position information SPOS output from the interpolator 323 or an initial lens moving range MOV_I in response to the face detection signal DFLAG. The lens moving range MOV_R may be defined by a start value and an end value, but the disclosure is not restricted to the current embodiments and the lens moving range MOV_R may include only the start value.

The initial lens moving range MOV_I may be stored in the register 325, but the disclosure is not restricted to the current embodiments. The initial lens moving range MOV_I may be stored in a memory (e.g., the external memory 30 or an internal memory (not shown) of the camera controller 10) in other embodiments. The initial lens moving range MOV_I may include an initial start value and an initial end value. However, the initial lens moving range MOV_I may include only the initial start value. At this time, the selector 324 may output, as the start value of the lens moving range MOV_R, either the start position information IPOS or the initial start value of the initial lens moving range MOV_I in response to the face detection signal DFLAG.

The lens moving range MOV_R, the initial lens moving range MOV_I, and the start position information IPOS or SPOS each may be expressed as a digital code (referred to as a "current control code") for controlling the driving current of the actuator 220. The position of the lens 210 is controlled according to the amount of driving current of the actuator 220. The start value of the lens moving range MOV_R may be a current control code for designating a lens position at which auto focusing starts and the end value of the lens moving range MOV_R may be a current control code for designating a lens position at which the auto focusing ends.

The autofocus calculator 330 seeks a lens focus position based on the lens moving range MOV_R determined by the lens moving range determiner 320. The autofocus calculator 330 receives an image IDATA captured by the image sensor 230 through the camera I/F 170, analyzes the image IDATA, and determines whether the lens 210 is in focus based on the analysis result. The autofocus calculator 330 controls the camera module 20 to change the position of the lens 210 within the lens moving range MOV_R and analyzes the image IDATA captured using the lens 210 whose position has been changed to seek the position of the lens 210 at which the lens 210 is in focus. Referring to FIG. 6, the autofocus calculator 330 includes a filter LUT 331, a contrast calculator 332, a focus determiner 333, a backlight detector 334, and a control signal generator 335.

The filter LUT 331 may store a plurality of different filter coefficients FC corresponding to the face detection signal DFLAG. The filter LUT 331 may store different filter coefficients FC according to the combination of the face detection signal DFLAG and a backlight detection signal DBL.

The backlight detection signal DBL indicates whether the image data IDATA has backlight. The autofocus calculator 330 may include a backlight detector 334 which detects whether the image data IDATA is an image exposed to backlight and outputs the backlight detection signal DBL. For instance, the backlight detector 334 may output the backlight detection signal DBL at a first logic level (e.g., "1") when the backlight is detected and may output the backlight detection signal DBL at a second logic level (e.g., "0") when the backlight is not detected. Accordingly, the filter LUT 331 may store filter coefficients FC respectively corresponding to the combinations (e.g., "11", "10", "01", and "00") of the face detection signal DFLAG and the backlight detection signal DBL.

The contrast calculator 332 receives and processes the image IDATA captured by the image sensor 230 and calculates a contrast value CTR. The image IDATA may be image data corresponding to one frame. The contrast calculator 332 may calculate the contrast value CTR using a contrast filter (not shown) which can change a filter coefficient. The coefficient of the contrast filter is a filter coefficient FC selected from the filter LUT 331 according to the face detection signal DFLAG and the backlight detection signal DBL. Accordingly, the contrast calculator 332 calculates the contrast value CTR using a different coefficient for the contrast filter according to whether a face is detected or not and whether backlight is detected or not.

When focus is adjusted using the contrast value CTR, accuracy of the focus depends on a contrast filter. A typical contrast filter is designed based on a high frequency filter (HPF) since it needs to be applied to normal images. However, an image of a face has more information in a medium band of spatial frequencies than an object having more texture. According to some embodiments of the disclosure, the coefficient of the contrast filter is changed to be more suitable to facial features when a face is detected, so that the contrast of the face is more accurately calculated.

In other embodiments, a contrast filter may be changed according to the face detection signal DFLAG and the backlight detection signal DBL. For instance, the contrast calculator 332 may include a plurality of contrast filters respectively corresponding to the combinations (e.g., "11", "10", "01", and "00") of the face detection signal DFLAG and the backlight detection signal DBL and may select one of the contrast filters according to the face detection signal DFLAG and the backlight detection signal DBL to calculate the contrast value CTR.

As described above, when a contrast filter is switched between a normal filter (e.g., a filter used when a face is not detected) and a face specific filter (e.g., a filter used when a face is detected) according to whether a face is detected or not, autofocus accuracy for portrait images can be increased.

The focus determiner 333 determines whether the lens 210 is in focus based on a peak value of the contrast value CTR. The contrast value CTR is obtained by quantifying a relative difference between the brightest part and the darkest part in the image IDATA.

When the contrast value CTR of the image IDATA is calculated while changing the position of the lens 210 within the lens moving range MOV_R, the contrast value CTR may gradually increase and then decrease. At this time, the lens 210 is in focus at a position corresponding to the peak value of the contrast value CTR. Accordingly, the focus determiner 333 may determine the focusing state and the focusing position of the lens 210 based on the peak value of the contrast value CTR and may send a determination result FDS to the control signal generator 335.

The control signal generator 335 may output the position control signal CON to the camera module 20 based on the determination result FDS of the focus determiner 333 and the lens moving range MOV_R. The control signal generator 335 may output the position control signal CON corresponding to the start value (i.e., the start current control code) of the lens moving range MOV_R to the camera module 20 and then may output the position control signal CON corresponding to a value one step higher than the start value of the lens moving range MOV_R to the camera module 20. As described above, the control signal generator 335 may output the position control signal CON for sequentially changing the position of the lens 210 to the camera module 20 until the control signal generator 335 receives the determination result FDS indicating that the lens 210 is in focus from the focus determiner 333. The position control signal CON may be converted into a signal complying with a predetermined interface standard in the camera I/F 170 before being transmitted to the camera module 20.

The control circuit 240 of the camera module 20 controls the driving current of the actuator 220 in response to the position control signal CON. Accordingly, the actuator 220 drives the lens 210 to a position corresponding to the position control signal CON.

In the current embodiments of the disclosure, a sensor for measuring or sensing the position of the lens 210 is not provided and the position of the lens 210 is controlled using the amount of driving current of the actuator 220 in the open-loop mode.

As described above, according to some embodiments of the disclosure, the start position of a lens is adjusted according to a face size using an LUT predetermined through a simulation or test, so that a range in which the lens needs to be moved to seek correct focus is greatly reduced. As a result, auto focusing speed is increased.

Figure 7:
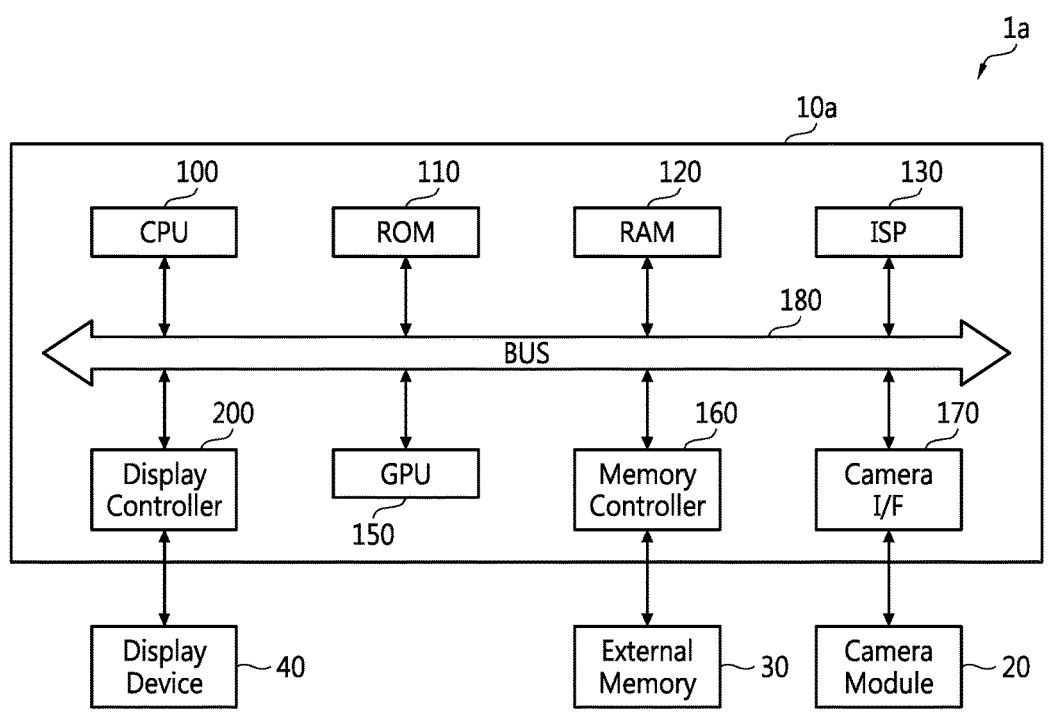
FIG. 7 is a block diagram of a camera system according to other embodiments of the disclosure.

FIG. 7 is a block diagram of a camera system 1a according to other embodiments of the disclosure. Referring to FIG. 7, the camera system 1a may be implemented as a portable electronic device. The portable electronic device may be a laptop computer, a cellular phone, a smart phone, a tablet personal computer (PC), a personal digital assistant (PDA), an enterprise digital assistant (EDA), a digital still camera, a digital video camera, a portable multimedia player (PMP), a mobile internet device (MID), a wearable computer, an internet of things (IoT) device, or an internet of everything (IoE) device.

The camera system 1a may include an SoC 10a, the camera module 20, the external memory 30, and the display device 40. The camera module 20, the external memory 30, and the display device 40 have been described with reference to FIG. 1 above. Thus, only differences between the camera systems 1 and 1a will be described to avoid redundancy. The camera system 1a may display a still image signal (or a still image) or a moving image signal (or a moving image), which has been picked up in the camera module 20, on the display device 40.

The external memory 30 stores program instructions executed in the SoC 10a. The external memory 30 may also store image data used to display still images or a moving image on the display device 40. The moving image is a sequence of different still images presented in a short period of time.

The external memory 30 may be formed of volatile or non-volatile memory. The volatile memory may be dynamic random access memory (DRAM), static RAM (SRAM), thyristor RAM (T-RAM), zero capacitor RAM (Z-RAM), or twin transistor RAM (TTRAM). The non-volatile memory may be electrically erasable programmable read-only memory (EEPROM), flash memory, magnetic RAM (MRAM), phase-change RAM (PRAM), or resistive memory.

The SoC 10a may perform the operations of the camera controller 10 illustrated in FIG. 1. The SoC 10a controls the camera module 20, the external memory 30, and the display device 40. The SoC 10a may be called an integrated circuit (IC), a processor, an application processor, a multimedia processor, or an integrated multimedia processor. The SoC 10a may include a central processing circuit (CPU) 100, a read-only memory (ROM) 110, a random access memory (RAM) 120, an image signal processor (ISP) 130, a display controller 200, a graphics processing unit (GPU) 150, a memory controller 160, the camera I/F 170, and a system bus 180. The SoC 10a may also include other elements apart from those elements illustrated in FIG. 7. The autofocus controller 300 described above with reference to FIG. 1 may be implemented in at least one element (e.g., the CPU 100 and the ISP 130) of the SoC 10a illustrated in FIG. 7 in a distributed fashion.

The CPU 100, which may be referred to as a processor, may process or execute programs and/or data stored in the external memory 30. For instance, the CPU 100 may process or execute the programs and/or the data in response to an operating clock signal output from a clock signal module (not shown). The CPU 100 may be implemented as a multi-core processor. The multi-core processor is a single computing component with two or more independent actual processors (referred to as cores). Each of the processors reads and executes program instructions.

The CPU 100 runs an operating system (OS). The OS may manage resources (such as memory and display) of the camera system 1a. The OS may distribute the resources to applications executed in the camera system 1a.

Programs and/or data stored in the ROM 110, the RAM 120, and/or the external memory 30 may be loaded to a memory (not shown) in the CPU 100 when necessary. The ROM 110 may store permanent programs and/or data. The ROM 110 may be implemented as erasable programmable ROM (EPROM) or EEPROM.

The RAM 120 may temporarily store programs, data, or instructions. The programs and/or data stored in the memory 110 or 30 may be temporarily stored in the RAM 120 according to the control of the CPU 100 or a booting code stored in the ROM 110. The RAM 120 may be implemented as DRAM or SRAM.

The ISP 130 may perform various kinds of image signal processing. The ISP 130 may process image data received from the image sensor 230 (in FIG. 1). For instance, the ISP 130 may analyze the image data received from the image sensor 230 and determine the focus state. The ISP 130 may also perform shake correction, white balance, color correction in terms of brightness or contrast, color harmony, quantization, and color conversion into a different color space on the image data received from the image sensor 230. The ISP 130 may periodically store the processed image data in the external memory 30 via the system bus 180.

The GPU 150 may read and execute program instructions involved in graphics processing. The GPU 150 may process graphic figures at a high speed. The GPU 150 may also convert data read by the memory controller 160 from the external memory 30 into a signal suitable to the display device 40. Besides the GPU 150, a graphics engine (not shown) or a graphics accelerator (not shown) may also be used for graphics processing.

The camera I/F 170 interfaces with the camera module 20. For instance, the camera I/F 170 may output a control signal for controlling the camera module 20 and may receive image data from the camera module 20 according to a predetermined interface standard or protocol. The camera I/F 170 may store the image data received from the camera module 20 in the external memory 30 or may transmit the image data to another element, e.g., the ISP 130.

The memory controller 160 interfaces with the external memory 30. The memory controller 160 controls the overall operation of the external memory 30 and controls data exchange between a host and the external memory 30. For instance, the memory controller 160 may write data to or read data from the external memory 30 at the request of the host. Here, the host may be a master device such as the CPU 100, the GPU 150, the display controller 200, or the camera I/F 170. The memory controller 160 may read image data from the external memory 30 and provide the image data for the display controller 200 in response to an image data request of the display controller 200.

The display controller 200 controls the operations of the display device 40. The display controller 200 receives image data to be displayed on the display device 40 via the system bus 180, converts the image data into a signal (e.g., a signal complying with an interface standard) for the display device 40, and transmits the signal to the display device 40.

The elements 100, 110, 120, 130, 150, 160, 170, and 200 may communicate with one another via the system bus 180. In other words, the system bus 180 connects to each of the elements 100, 110, 120, 130, 150, 160, 170, and 200 of the SoC 10a, functioning as a passage for data transmission between elements. The system bus 180 may also function as a passage for transmission of a control signal between elements.

The system bus 180 may include a data bus (not shown) for transmitting data, an address bus (not shown) for transmitting an address signal, and a control bus (not shown) for transmitting a control signal. The system bus 180 may include a small-scale bus, i.e., an interconnector for data communication between predetermined elements.

Figure 8:
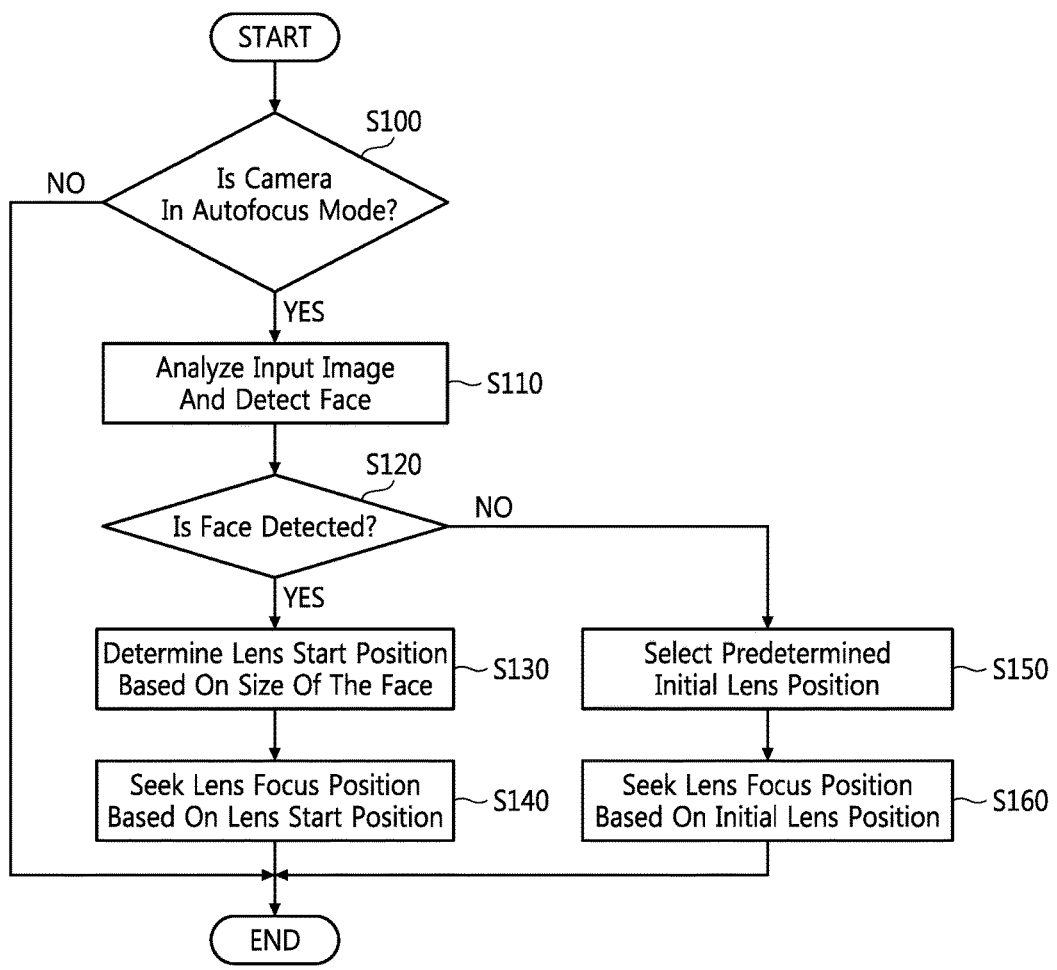
FIG. 8 is a flowchart of an autofocus method of a camera according to some embodiments of the disclosure.
Figure 9:
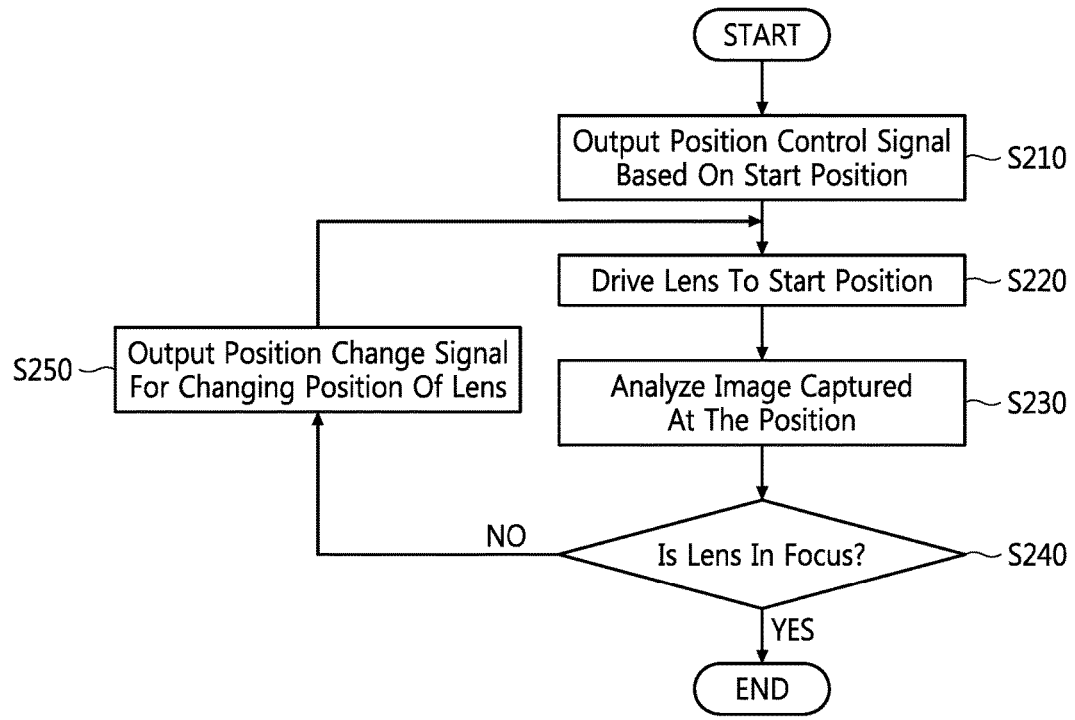
FIG. 9 is a flowchart of an operation of seeking a lens focus position in the method illustrated in FIG. 8 according to some embodiments of the disclosure.

FIG. 8 is a flowchart of an autofocus method of a camera according to some embodiments of the disclosure. FIG. 9 is a flowchart of an operation of seeking a lens focus position in the method illustrated in FIG. 8 according to some embodiments of the disclosure. The autofocus method illustrated in FIGS. 8 and 9 may be performed by the camera system 1 or 1a illustrated in FIG. 1 or 7.

Referring to FIGS. 1 through 9, the camera controller 10 or the SoC 10a determines whether a camera is in autofocus mode in operation S100. When it is determined that the camera is in the autofocus mode, the camera controller 10 or the SoC 10a receives an input image from the camera module 20 and analyzes the image to detect a face in operation S110.

When the face is detected (in case of YES) in operation S120, the size of the face is calculated and a lens start position is determined according to the face size in operation S130. At this time, the camera controller 10 or the SoC 10a may determine the lens start position using an LUT (e.g., the LUT 321 in FIG. 5) which stores lens start position information corresponding to each of predetermined face sizes or using a predetermined algorithm, but the disclosure is not restricted to the current embodiments. Thereafter, the camera controller 10 or the SoC 10a seeks a focus position of the lens 210 based on the lens start position in operation S140.

When the face is not detected (in case of NO) in operation S120, the camera controller 10 or the SoC 10a selects a predetermined initial lens position in operation S150 and seeks the focus position of the lens 210 based on the initial lens position in operation S160. The initial lens position may be preset in the register 325 illustrated in FIG. 3.

Referring to FIG. 9, the position control signal CON is output to the camera module 20 based on the determined lens start position, i.e., the start value of the lens moving range in operation S210. The camera module 20 drives the lens 210 to the start position in response to the position control signal CON, captures an image using the lens 210 at the start position, and transmits the captured image to the camera controller 10 or the SoC 10a in operation S220. The camera controller 10 or the SoC 10a receives and analyzes the image in operation S230 and determines whether or not the lens 210 is in focus based on the analysis result in operation S240. When it is determined that the lens 210 is not in focus, the camera controller 10 or the SoC 10a outputs a position change signal for changing the position of the lens 210 to the camera module 20 in operation S250. The position change signal may be the position control signal CON corresponding to a value one step higher than the start value of the lens moving range MOV_R.

The camera module 20 changes the position of the lens 210 in response to the position change signal, captures an image using the lens 210 at the changed position, and transmits the captured image to the camera controller 10 or the SoC 10a in operation S220. The camera controller 10 or the SoC 10a receives and analyzes the image in operation S230 and determines whether the lens 210 is in focus based on the analysis result in operation S240. Such procedure may be repeated until the lens 210 is in focus.

Figure 10:
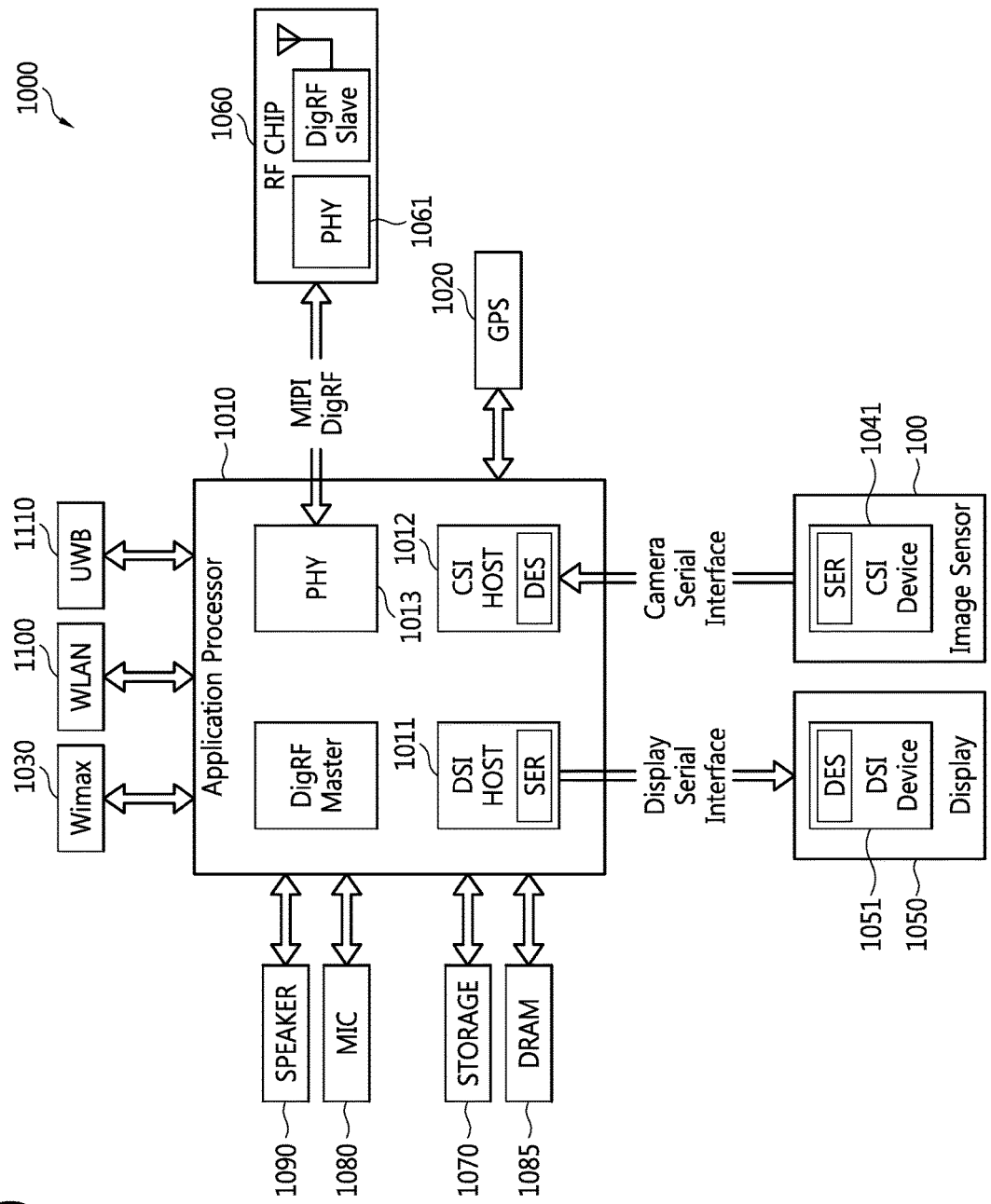
FIG. 10 is a block diagram of an electronic system according to an embodiment of the disclosure.

FIG. 10 is a block diagram of an electronic system 1000 according to an embodiment of the disclosure.

Referring to FIG. 10, the electronic system 1000 may be a data processing apparatus capable of using or supporting a MIPI interface, e.g., a mobile phone, a personal digital assistant (PDA), a portable multimedia player (PMP), an internet protocol television (IPTV), or a smart phone.

The electronic system 1000 includes an application processor 1010, the image sensor 100, and a display unit 1050.

A camera serial interface (CSI) host 1012 included in the application processor 1010 may establish serial communication with a CSI device 1041 of the image sensor 100 through a CSI. For example, an optical deserializer may be included in the CSI host 1012, and an optical serializer may be included in the CSI device 1041.

A display serial interface (DSI) host 1011 included in the application processor 1010 may establish serial communication with a DSI device 1051 of the display 1050 through a DSI. For example, an optical serializer may be included in the DSI host 1011 and an optical deserializer may be included in the DSI device 1051.

The electronic system 1000 may further include a radio-frequency (RF) chip 1060 for communicating with the application processor 1010. A physical layer PHY 1013 of the electronic system 1000 and a physical layer PHY 1061 of the RF chip 1060 may exchange data with each other according to the MIPI DigRF standard.

The electronic system 1000 may further include a global positioning system (GPS) 1020, a storage unit 1070, a microphone 1080, a dynamic random access memory (DRAM) 1085, and a speaker 1090. The electronic system 1000 may establish communication using world-wide interoperability for microwave (Wimax) 1030, a wireless local area network (WLAN) 1100, an ultra-wide band (UWB) 1110, etc.

The present general disclosure can also be embodied as computer-readable codes on a non-transitory computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general disclosure can be easily constructed by programmers.

As described above, according to some embodiments of the disclosure, a range for autofocus of a camera lens, i.e., a moving range of the lens is determined using a result of detecting a face, so that the lens moving range is reduced. As a result, autofocus speed is increased. In addition, a focus state of an input image is determined using a different filter according to a face detection result and the existence or non-existence of backlight in the image, so that autofocus accuracy is increased. In particular, a face specific filter is used according to the face detection result to calculate a contrast and the focus state is determined based on the contrast, so that autofocus accuracy for portrait photos or video is enhanced.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been particularly shown and described with reference to exemplary embodiments thereof, it will be understood by those of ordinary skill in the art that various changes in forms and details may be made therein without departing from the spirit and scope of the disclosure as defined by the following claims.

What is claimed is:

1. An autofocus method of a camera which includes an actuator controlling a position of a lens in an open-loop mode, the autofocus method comprising:
    receiving and analyzing an image captured using the lens and generating a face detection signal indicating whether a face is detected based on an analysis result;
    calculating a size of the face in response to detecting the face;
    determining a start position of the lens based on the size of the face; and
    seeking a focus position of the lens based on the start position of the lens, wherein:
    seeking the focus position of the lens comprises:
        outputting a position control signal based on the start position;
        receiving a next image which has been captured using the lens driven to the start position;
        calculating a contrast value of the next image using a contrast filter; and
        determining whether the lens is in focus based on the contrast value, and
    a coefficient of the contrast filter changes according to the face detection signal.

2. The autofocus method of claim 1, further comprising:
    generating a backlight detection signal indicating existence or non-existence of backlight based on the analysis result, wherein
    the coefficient of the contrast filter changes according to the backlight detection signal.

3. The autofocus method of claim 2, wherein the calculating of the contrast value comprises:
    selecting the contrast filter coefficient corresponding to the face detection signal and the backlight detection signal from a filter lookup table which stores a plurality of different contrast filter coefficients; and
    applying the selected contrast filter coefficient to the contrast filter.

4. The autofocus method of claim 1, wherein seeking the focus position of the lens further comprises:
    outputting a position change signal in response to determining that the lens is not in focus; and
    receiving another image which has been captured using the lens driven to a position changed according to the position change signal and calculating the contrast value of the other image.

5. The autofocus method of claim 4, wherein determining whether the lens is in focus comprises determining whether the lens is in focus based on a peak value of the contrast value.

6. The autofocus method of claim 1, wherein the determining the start position of the lens based on the size of the face comprises:
    selecting at least two start position information items approximating to the size of the face from a lookup table which stores start position information corresponding to each of a plurality of face sizes; and
    performing interpolation on the at least two start position information items and outputting an interpolation result as the start position.

7. The autofocus method of claim 1, further comprising:
    setting initial position information in a register; and
    in response to not detecting the face in the image, seeking the focus position based on the initial position information.

8. A camera controller for controlling a camera module which includes an actuator controlling a position of a lens in an open-loop mode, the camera controller comprising:
    a face detector configured to receive and analyze an image captured using the lens, to generate a face detection signal indicating whether a face is detected based on an analysis result, and to calculate a size of the face in response to detecting the face;
    a lens moving range determiner configured to determine a start position of the lens based on the size of the face; and
    an autofocus calculator configured to output a position control signal, for controlling the position of the lens according to the start position, to the camera module and to seek a focus position of the lens, wherein
    the autofocus calculator further comprises a backlight detector configured to analyze the captured image and generate a backlight detection signal indicating existence or non-existence of backlight.

9. The camera controller of claim 8, wherein the lens moving range determiner comprises:
    a lookup table configured to store start position information corresponding to each of a plurality of face sizes and to output at least one start position information item approximating to the calculated size of the face;

a register configured to store multiple items of initial position information; and a selector configured to select and output one of the items of initial position information and the start position information from the lookup table in response to the face detection signal.

10. The camera controller of claim 8, wherein the autofocus calculator outputs the position control signal to the camera module based on the start position, receives a next image which has been captured using the lens driven to the start position, calculates a contrast value of the next image using a contrast filter, and determines whether the lens is in focus based on the contrast value.

11. The camera controller of claim 10, wherein the autofocus calculator comprises:

a filter lookup table configured to store a plurality of different filter coefficients and to select and output one of the filter coefficients which corresponds to the face detection signal; and a contrast calculator configured to calculate the contrast value using the contrast filter to which the selected filter coefficient has been applied.

12. The camera controller of claim 8, wherein a coefficient of a contrast filter changes according to the backlight detection signal.

13. A camera comprising:

a lens; and an electronic controller that:

determines whether imagery of a face exists in a first image created by light received through the lens, selects a contrast filter among a plurality of contrast filters based upon the imagery determination, and applies the selected contrast filter to the first image or a second image, created by light received through the lens, to determine whether the first or second image is focused.

14. The camera of claim 13, wherein the electronic controller:

determines whether backlighting is applied to an object that is represented in the first image, and selects the contrast filter based on both the imagery determination and the backlighting determination.

15. The camera of claim 14, wherein the electronic controller:

selects a first contrast filter if both no backlighting is determined to be applied to the object and no face imagery is determined to exist in the first image, selects a second contrast filter if both no backlighting is determined to be applied to the object and face imagery is determined to exist in the first image, selects a third contrast filter if both backlighting is determined to be applied to the object and no face imagery is determined to exist in the first image, and selects a fourth contrast filter if both backlighting is determined to be applied to the object and face imagery is determined to exist in the first image, wherein each of the first, second, third, and fourth contrast filters differs from all other of the contrast filters.

16. The camera of claim 13, further comprising:

an actuator that adjusts a position of the lens along an axis within the camera, wherein the electronic controller controls the actuator to move the lens within a predetermined range until focus is achieved for the first or second image.

17. The camera of claim 16, wherein the electronic controller determines the predetermined range based upon a size of face imagery within the first image.

* * * * *